United States Patent
Ienaga

(10) Patent No.: US 10,821,838 B2
(45) Date of Patent: Nov. 3, 2020

(54) VEHICLE CONTROL DEVICE AND VEHICLE CONTROL METHOD

(71) Applicant: FUJI JUKOGYO KABUSHIKI KAISHA, Tokyo (JP)

(72) Inventor: Hiroshi Ienaga, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 911 days.

(21) Appl. No.: 14/855,157

(22) Filed: Sep. 15, 2015

(65) Prior Publication Data

US 2016/0090004 A1 Mar. 31, 2016

(30) Foreign Application Priority Data

Sep. 30, 2014 (JP) .................. 2014-200741

(51) Int. Cl.
| | | |
|---|---|---|
| *B60L 15/20* | (2006.01) | |
| *B60L 3/10* | (2006.01) | |
| *B60L 3/00* | (2019.01) | |

(52) U.S. Cl.
CPC ......... *B60L 15/2036* (2013.01); *B60L 3/0015* (2013.01); *B60L 3/102* (2013.01); *B60L 15/2054* (2013.01); *B60L 2220/42* (2013.01); *B60L 2240/421* (2013.01); *B60L 2240/423* (2013.01); *B60L 2240/461* (2013.01); *B60L 2240/465* (2013.01); *Y02T 10/645* (2013.01); *Y02T 10/646* (2013.01); *Y02T 10/72* (2013.01); *Y02T 10/7275* (2013.01)

(58) Field of Classification Search
CPC .... B60L 5/2036; B60L 15/2036; B60L 3/102; B60L 3/0015; B60L 15/2054

USPC .......................................................... 701/22
See application file for complete search history.

(56) References Cited

U.S. PATENT DOCUMENTS

| | | | | |
|---|---|---|---|---|
| 2002/0156580 | A1* | 10/2002 | Matsuura | B60T 7/22 701/301 |
| 2004/0193374 | A1* | 9/2004 | Hac | B60K 31/0008 701/301 |
| 2005/0267660 | A1* | 12/2005 | Fujiwara | B60T 8/17558 701/41 |
| 2005/0267683 | A1* | 12/2005 | Fujiwara | B60T 8/17558 701/301 |
| 2007/0001510 | A1* | 1/2007 | Miller | B60T 8/1764 303/149 |
| 2007/0219720 | A1* | 9/2007 | Trepagnier | B60W 30/00 701/300 |

(Continued)

FOREIGN PATENT DOCUMENTS

| | | |
|---|---|---|
| JP | 2002-316633 A | 10/2002 |
| JP | 2007-209068 A | 8/2007 |

*Primary Examiner* — Charles A Fox
*Assistant Examiner* — Michael E Butler
(74) *Attorney, Agent, or Firm* — Chip Law Group

(57) ABSTRACT

A vehicle control device includes an obstacle detection unit that detects an obstacle in front of a vehicle and detects a distance to the obstacle, a maximum driving force difference calculation module that calculates, on the basis of the detected distance to the obstacle, a maximum driving force difference between a left wheel and a right wheel, and a redistribution control module that redistributes, when an actual driving force difference of respective motors that drive the left and right wheels exceeds the maximum driving force difference, torques of the respective motors in a manner that the actual driving force difference becomes lower than or equal to the maximum driving force difference.

20 Claims, 11 Drawing Sheets

(56) References Cited

U.S. PATENT DOCUMENTS

| | | | | |
|---|---|---|---|---|
| 2008/0015778 A1* | 1/2008 | Matsuura | ............... | G08G 1/166 701/301 |
| 2008/0281521 A1* | 11/2008 | Shirato | ............... | B60T 7/22 701/301 |
| 2008/0312793 A1* | 12/2008 | Schutz | ............... | B60T 8/1764 701/42 |
| 2010/0256852 A1* | 10/2010 | Mudalige | ............... | G08G 1/163 701/24 |
| 2010/0324823 A1* | 12/2010 | Kobayashi | ............... | B60T 7/22 701/301 |
| 2012/0072067 A1* | 3/2012 | Jecker | ............... | B62D 15/0285 701/25 |
| 2012/0226417 A1* | 9/2012 | Nishikawa | ............... | B60T 8/1755 701/42 |
| 2012/0316725 A1* | 12/2012 | Trepagnier | ............... | G01S 17/023 701/26 |
| 2014/0142839 A1* | 5/2014 | Kaminade | ............... | G08G 1/166 701/301 |
| 2014/0195118 A1* | 7/2014 | Okubo | ............... | B60T 8/26 701/41 |
| 2014/0350815 A1* | 11/2014 | Kambe | ............... | B60T 7/22 701/70 |
| 2015/0042151 A1* | 2/2015 | Zimmermann | ............... | B60T 8/1755 303/3 |
| 2015/0046015 A1* | 2/2015 | Ulbricht | ............... | G08G 1/167 701/23 |
| 2015/0151750 A1* | 6/2015 | Tsuchiya | ............... | B60W 30/09 701/41 |
| 2015/0170522 A1* | 6/2015 | Noh | ............... | G08G 1/096741 701/117 |
| 2015/0203126 A1* | 7/2015 | Kobana | ............... | B60W 50/12 701/93 |
| 2015/0251656 A1* | 9/2015 | Yester | ............... | B60W 30/09 701/41 |

* cited by examiner

VEHICLE CONTROL DEVICE AND VEHICLE CONTROL METHOD

CROSS-REFERENCE TO RELATED APPLICATIONS

The present application claims priority from Japanese Patent Application No. 2014-200741 filed on Sep. 30, 2014, the entire contents of which are hereby incorporated by reference.

BACKGROUND

1. Technical Field

The present disclosure relates to a vehicle control device and a vehicle control method.

2. Related Art

When either one of the left and right wheels slips, a left-and-right driving force difference that occurs actually becomes different from a target driving force difference, and therefore, a yaw moment that the driver does not intend is generated. In order to prevent this, as related art, for example, Japanese Unexamined Patent Application Publication (JP-A) No. 2007-209068 discloses a technique for estimating a generated driving force of the slipping wheel and reducing the torque of the non-slipping wheel (performing torque down) in a manner that the target driving force difference and the actual driving force difference become equal to each other.

In addition, Japanese Unexamined Patent Application Publication (JP-A) No. 2002-316633 discloses a configuration for detecting an obstacle in a travelling direction and for calculating the distance to the obstacle. In this configuration, on the basis of a vehicle speed, steering wheel angle, and lateral acceleration, a clutch torque is computed according to a vertical load of the left wheels and that of the right wheels of the vehicle, and this clutch torque is corrected by a deviation between a target yaw rate and an actual yaw rate, so as to generate a final clutch torque.

In a case where a vehicle travels on a narrow road where snow remains on the shoulder, for example, when the vehicle slips due to snow on the shoulder and turns toward the shoulder (low-μ side), the vehicle may contact with an obstacle such as a wall or gutter on the shoulder. The technique disclosed in JP-A No. 2007-209068 is able to suppress the turning of the vehicle by performing torque down of the non-slipping wheels, but the driving forces of the non-slipping wheels are reduced at the same time. Thus, unfortunately, when such a control is performed constantly, the driving force becomes insufficient and the driver's desired driving state cannot be maintained.

Although JP-A No. 2002-316633 refers to the detection of the distance to the obstacle, it does not mention anything about the accomplishment in suppressing turning in accordance with the distance to the obstacle and in securing the driving force.

SUMMARY OF THE INVENTION

The present disclosure has been achieved in view of the above disadvantages, and the present disclosure provides a novel and improved vehicle control device and vehicle control method that can suppress turning of a vehicle due to a difference in friction factor between left and right wheels on a road surface and can secure a driving force.

An aspect of the present disclosure provides a vehicle control device including an obstacle detection unit that detects an obstacle in front of a vehicle and detects a distance to the obstacle, a maximum driving force difference calculation module that calculates, on the basis of the detected distance to the obstacle, a maximum driving force difference between a left wheel and a right wheel, and a redistribution control module that redistributes, when an actual driving force difference of respective motors that drive the left and right wheels exceeds the maximum driving force difference, torques of the respective motors in a manner that the actual driving force difference becomes lower than or equal to the maximum driving force difference.

The redistribution control module may limit a torque of a motor having a larger actual driving force of the respective motors that drive the respective left and right wheels, to a value obtained by adding the maximum driving force difference to the actual driving force of a motor having a smaller actual driving force of the respective motors.

The redistribution control module may set a torque of the motor having the smaller actual driving force of the respective motors as a driver's requested driving force obtained from an accelerator position and a braking operation amount.

A slip determination module that sets a lowest rotation speed among rotation speeds of wheels as a base rotation speed and determines a slip of the left and right wheels on the basis of the base rotation speed and rotation speeds of the motors of the respective wheels may be further included, and when it is determined that either one of the left and right wheels is slipping, the redistribution control module may calculate the torques to be redistributed.

A target rotation speed calculation module that calculates target rotation speeds of the wheels on the basis of the base rotation speed, and a rotation speed control module that calculates, on the basis of a result of slip determination by the slip determination module, a request torque of a motor of a slipping wheel from a torque of the slipping wheel calculated by the redistribution control module in a manner that the rotation speed of the slipping wheel becomes equal to the target rotation speed may be further included.

The maximum driving force difference calculation module may calculate the maximum driving force difference in accordance with the distance to the obstacle and a steering wheel steering angle.

A warning generation unit that generates a warning to a driver in response to the calculation of the torques to be redistributed by the redistribution control module may be further included.

Another aspect of the present disclosure provides a vehicle control method including detecting an obstacle in front of a vehicle and detecting a distance to the obstacle, calculating, on the basis of the detected distance to the obstacle, a maximum driving force difference between a left wheel and a right wheel, and calculating and redistributing, when an actual driving force difference of respective motors that drive the left and right wheels exceeds the maximum driving force difference, torques of the respective motors in a manner that the actual driving force difference becomes lower than or equal to the maximum driving force difference.

DETAILED DESCRIPTION

Figure 1:
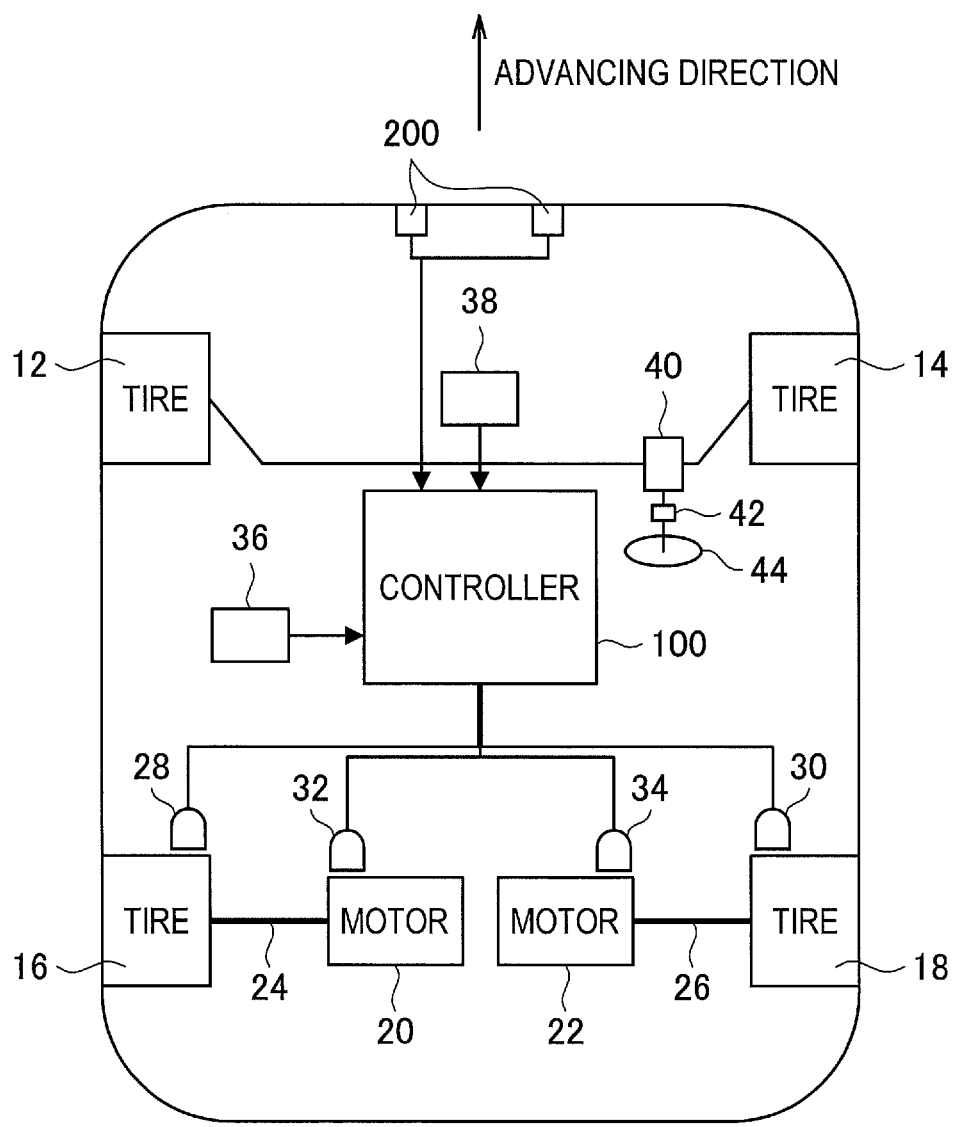
FIG. 1 is a schematic diagram illustrating the configuration of a vehicle according to an implementation of the present disclosure.

Hereinafter, a preferred implementation of the present disclosure will be described in detail with reference to the appended drawings. Note that, in this specification and the appended drawings, structural elements that have substantially the same function and structure are denoted with the same reference numerals, and repeated description of these structural elements is omitted.

First of all, with reference to FIG. 1, the configuration of a vehicle 500 according to the implementation of the present disclosure will be described. FIG. 1 is a schematic diagram illustrating the configuration of the vehicle 500 according to the implementation of the present disclosure. As illustrated in FIG. 1, the vehicle 500 includes four front and rear tires (wheels) 12, 14, 16 and 18, a vehicle control device (controller) 100, two motors (drive units) 20 and 22 that control the rotation of the respective rear wheel tires 16 and 18, drive shafts 24 and 26 that couple the respective motors 20 and 22 with the respective tires 16 and 18, wheel speed sensors 28 and 30 that detect wheel speeds of the respective rear wheel tires 16 and 18 from the rotation thereof, motor rotation speed sensors 32 and 34 that detect rotation speeds of the respective motors 20 and 22, an acceleration sensor 36, and a yaw rate sensor 38. The vehicle 500 further includes, as in the rear wheel part, two motors (drive units) that control the rotation of the respective front wheel tires 12 and 14, drive shafts that couple the respective motors with the respective tires 12 and 14, wheel speed sensors that detect wheel speeds of the respective front wheel tires 12 and 14 from the rotation thereof, and motor rotation speed sensors that detect rotation speeds of the respective motors of the front wheels. The wheel speed sensors of the respective wheels detect tire rotation speeds (wheel speeds) $N\_wheel$ (FL, FR, RL, RR) of the respective wheels. The motor rotation speed sensors of the respective wheels detect motor rotation speeds $N\_motor$ (FL, FR, RL, RR) of the respective wheels. The vehicle 500 further includes a power steering mechanism (P/S) 40, a steering angle sensor 42, and a steering wheel 44 that operates steering angles of the respective front wheel tires 12 and 14. The vehicle 500 is configured as an electric vehicle that independently drives the four tires (12, 14, 16, and 18).

The vehicle 500, on which the control device 100 is mounted, detects obstacles such as a wall and gutter located on the side of the vehicle 500 by using an external environment recognition unit 200 that is constituted by a stereo camera assembly, for example, and that can monitor the front area.

The external environment recognition unit 200 includes a pair of left and right cameras including image sensors such as CCD sensors or CMOS sensors. The external environment recognition unit 200 images the external environment of the vehicle so as to recognize the external environment as image information. As an example, the external environment recognition unit 200 according to the present implementation is constituted by color cameras by which color information can be obtained. On the basis of the pair of left and right stereo images, captured by the image sensors, the external environment recognition unit 200 detects an obstacle and also the distance to the obstacle. The external environment recognition unit 200 in the present implementation corresponds to the obstacle detection unit of the appended claims.

Figure 2:
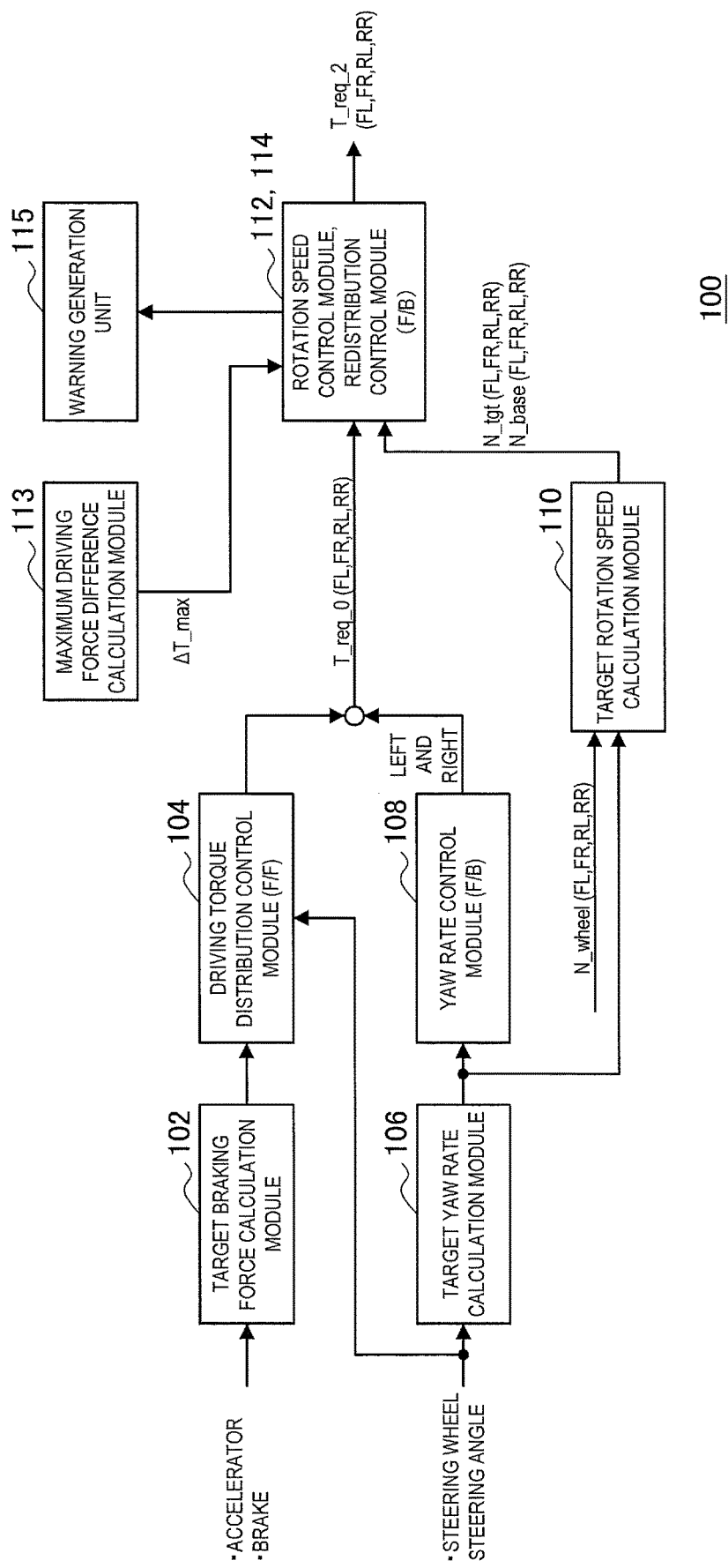
FIG. 2 is a schematic diagram illustrating the entire configuration of a vehicle control device according to the present implementation.
Figure 3:
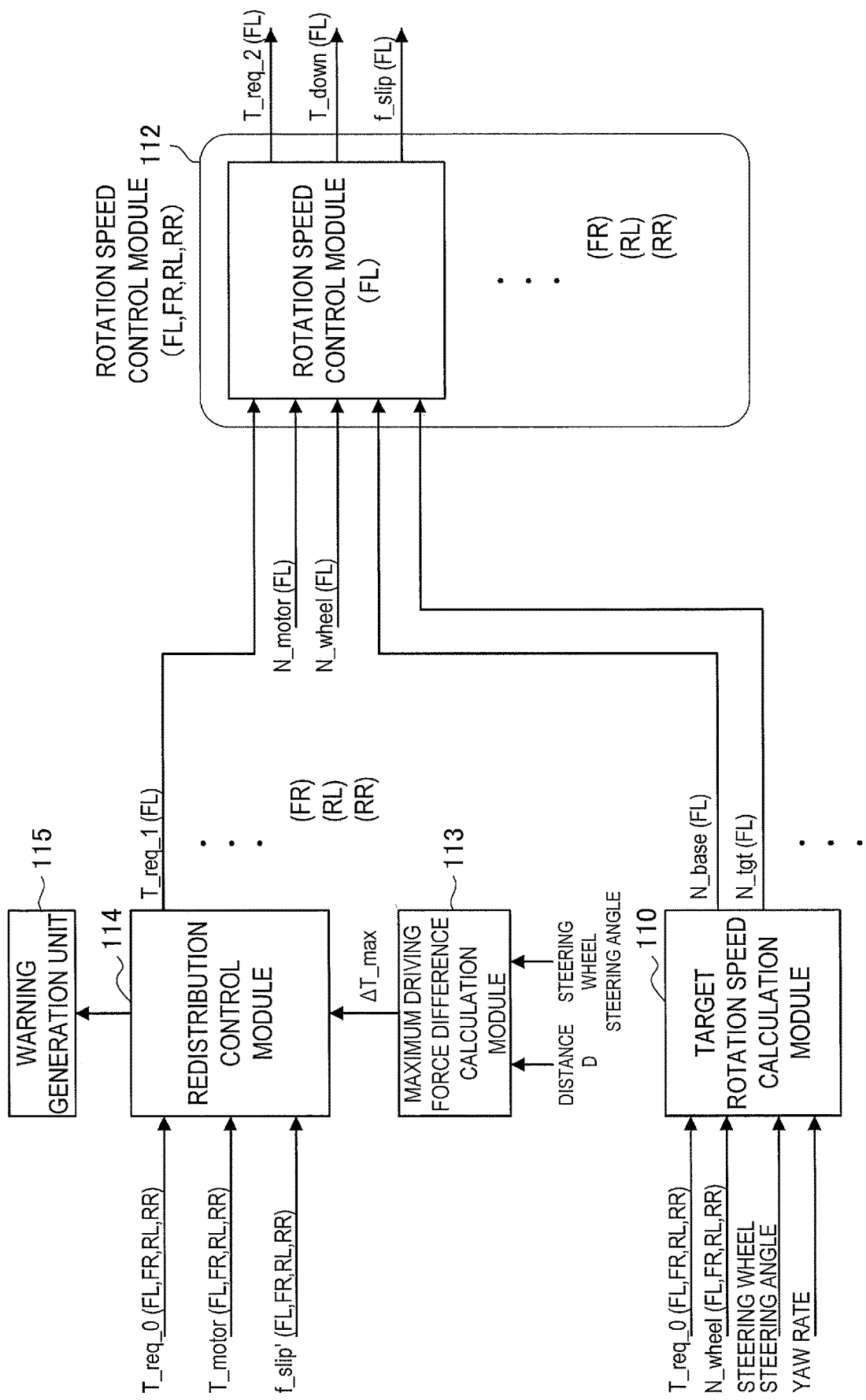
FIG. 3 is a block diagram specifically illustrating a rotation speed control module, a redistribution control module, and a target rotation speed calculation module in the configuration illustrated in FIG. 2.

FIG. 2 is a schematic diagram illustrating the entire configuration of the vehicle control device 100 according to the present implementation. FIG. 3 is a schematic diagram illustrating the configuration related to slip control according to the present implementation in the configuration illustrated in FIG. 2. As illustrated in FIG. 2, the vehicle control device 100 includes a target braking force calculation module 102, a driving torque distribution control module 104, a target yaw rate calculation module 106, a yaw rate control module 108, a target rotation speed calculation module 110, a rotation speed control module 112, a maximum driving force difference calculation module 113, a redistribution control module 114, and a warning generation unit 115. The vehicle control device 100 converts the driving force from the gear ratio and the tire diameter to the torque, and performs calculation on the basis of a motor axis torque.

In FIG. 2, on the basis of an accelerator position and a braking operation amount, the target braking force calculation module 102 calculates a target braking force. On the basis of the target braking force, the driving torque distribution control module 104 performs feedforward (F/F) control on the distribution of the driving torque of each wheel. Specifically, the torque distribution to front and rear wheels is different in acceleration and deceleration, and thus, the driving torque distribution control module 104 determines an acceleration/deceleration state on the basis of the target braking force to optimally distribute the torques to the front and rear wheels according to the degree of acceleration or deceleration of the vehicle 500. The driving torque distribution control module 104 also optimally distributes the torques to left and right wheels on the basis of a steering wheel steering angle.

On the basis of the steering wheel steering angle, the target yaw rate calculation module 106 calculates a target yaw rate. The yaw rate control module 108 performs feedback (F/B) control on an actual yaw rate with respect to the target yaw rate, the actual yaw rate being detected by the yaw rate sensor 38, and outputs the driving torque of each wheel for making the target yaw rate equal to the actual yaw rate. Thus, in a case where a minute slip is generated by the torques distributed by the driving torque distribution control module 104, the slip can be suppressed by the control of the yaw rate control module 108.

From the driving torque of each wheel obtained by the driving torque distribution control module 104 and the driving torque of each wheel obtained by the yaw rate control module 108, a high-level requested torque T_req_0 corresponding to a driver's requested torque is obtained. The high-level requested torque T_req_0 is obtained for each wheel (FL, FR, RL, RR). Here, FL denotes the front left wheel, FR denotes the front right wheel, RL denotes the rear left wheel, and RR denotes the rear right wheel. The high-level requested torques T_req_0 (FL, FR, RL, RR) are inputted to the redistribution control module 114.

The rotation speed control module 112, the redistribution control module 114, and the target rotation speed calculation module 110 constitute a slip control system according to the present implementation. In the present implementation, in a case where the driving torque of each wheel obtained by the driving torque distribution control module 104 is corrected by the driving torque of each wheel obtained by the yaw rate control module 108, and the motor of each wheel is driven by each of the thus obtained high-level requested torques T_req_0, when a slip is generated on each wheel, the slip control system performs control so that the slip can be surely suppressed. In this slip control system, rotation speed control is independently performed for each wheel, and by using the result, torque redistribution control is performed; thus, the driving force and stability as high as those of a diff-lock are secured.

FIG. 3 is a block diagram specifically illustrating the rotation speed control module 112, the redistribution control module 114, and the target rotation speed calculation module 110 in the configuration illustrated in FIG. 2. With reference to FIG. 3, the configuration of the vehicle control device 100 according to the present implementation will be described below in detail. The target rotation speed calculation module 110 receives the tire rotation speeds N_wheel (FL, FR, RL, RR) of the respective wheels, the steering wheel steering angle, the yaw rate, and the high-level requested torques T_req_0. The target rotation speed calculation module 110 sets, as a base rotation speed N_base_0, the lowest tire rotation speed among tire rotation speeds N_wheel (FL, FR, RL, RR) of the respective wheels. Note that, when it is determined that regeneration is performed from the high-level requested torque T_req_0, the target rotation speed calculation module 110 sets, as the base rotation speed N_base_0, the highest rotation speed among tire rotation speeds N_wheel (FL, FR, RL, RR) of the respective wheels.

The target rotation speed calculation module 110 calculates base rotation speeds N_base (FL, FR, RL, RR) of the respective wheels on the basis of the base rotation speed N_base_0, the steering wheel steering angle, the yaw rate, and the like. In this case, the target rotation speed calculation module 110 calculates a slipping angle of the body from the base rotation speed N_base_0, the steering wheel steering angle, and the yaw rate, and calculates the base rotation speeds N_base (FL, FR, RL, RR) of the respective wheels from the slipping angle of the body, vehicle parameters (front and rear treads, a wheel base, the distance between the center of gravity the front axle, and a distance between the center of gravity and the rear axle), and the base rotation speed N_base_0. The base rotation speeds N_base (FL, FR, RL, RR) of the respective wheels correspond to the rotation speeds when a slip is not generated, which are used as a base rotation speed for slip determination. In addition, the target rotation speed calculation module 110 calculates target rotation speeds N_tgt (FL, FR, RL, RR) of the respective wheels from the base rotation speeds N_base (FL, FR, RL, RR) of the respective wheels and a target slip ratio. In this case, the target rotation speed calculation module 110 compares, for each wheel, the product obtained by multiplying the base rotation speeds N_base (FL, FR, RL, RR) by the target slip ratio with the sum of the base rotation speeds N_base (FL, FR, RL, RR) and a target rotation difference, and sets the highest value (the lowest value at the time of regeneration) as N_tgt (FL, FR, RL, RR) of each wheel. The target rotation speeds N_tgt (FL, FR, RL, RR) of the respective wheels are target rotation speeds obtained on the assumption that a slip may be generated. The target rotation speed calculation module 110 outputs the calculated base rotation speeds N_base (FL, FR, RL, RR) of the respective wheels and the target rotation speeds N_tgt (FL, FR, RL, RR) of the respective wheels to the rotation speed control module 112. Note that FIG. 3 illustrates a case where the target rotation speed calculation module 110 outputs the base rotation speed N_base (FL) of the front left wheel and the target rotation speed N_tgt (FL) of the front left wheel to the rotation speed control module 112; in the same manner, the target rotation speed calculation module 110 also outputs the base rotation speeds N_base and target rotation speeds N_tgt of the other wheels.

The redistribution control module 114 receives the high-level requested torque T_req_0. The redistribution control module 114 also receives actual motor torques T_motor (FL, FR, RL, RR) of the respective wheels, slip determination flags f_slip' of the respective wheels in the previous control cycle, and a maximum torque difference ΔT_max. Here, the actual motor torques T_motor (FL, FR, RL, RR) are calculated from current values in an inverter (motor controller) controlling each motor, and thus, signals obtained from the inverter (motor controller) can be used as values of the actual motor torques T_motor (FL, FR, RL, RR) of the respective wheels. On the basis of the inputted values, the redistribution control module 114 calculates redistributed motor torques T_req_1 (FL, FR, RL, RR) of the respective wheels. Note that the control performed in the redistribution control module 114 will be described later in detail.

The rotation speed control module 112 receives the redistributed motor torques T_req_1 (FL, FR, RL, RR) of the respective wheels calculated by the redistribution control module 114, the motor rotation speeds N_motor (FL, FR, RL, RR) of the respective wheels, the tire rotation speeds N_wheel (FL, FR, RL, RR) of the respective wheels, the base rotation speeds N_base (FL, FR, RL, RR) of the respective wheels, and the target rotation speeds N_tgt (FL, FR, RL, RR) of the respective wheels. Note that FIG. 3 illustrates a case where the rotation speed control module 112 receives the redistributed motor torque T_req_1 (FL) of the front left wheel, the motor rotation speed N_motor (FL) of the front left wheel, the tire rotation speed N_wheel (FL) of the front left wheel, the base rotation speeds N_base (FL) of the front left wheel, and the target rotation speed N_tgt (FL) of the front left wheel; in the same manner, the rotation speed control module 112 also receives the motor torques T_req_1, the motor rotation speeds N_motor, the tire rotation speeds N_wheel, the base rotation speeds N_base, and the target rotation speeds N_tgt of the other wheels.

By use of the inputted requested torques T_req_1 (FL, FR, RL, RR) of the respective wheels, target rotation speeds N_tgt (FL, FR, RL, RR) of the respective wheels, base rotation speeds N_base (FL, FR, RL, RR) of the respective wheels, motor rotation speeds N_motor (FL, FR, RL, RR) of the respective wheels, tire rotation speeds N_wheel (FL, FR, RL, RR) of the respective wheels, and the like, the rotation speed control module 112 controls the rotation speed, and outputs the results as final requested torques T_req_2 (FL, FR, RL, RR) of motors of the respective wheels. Therefore, the rotation speed control module 112 includes blocks for calculating the requested torques T_req_2 (FL, FR, RL, RR) of motors of the respective wheels. FIG. 3 illustrates, among these blocks, a block for calculating the requested torque T_req_2 (FL) of the motor of the front left wheel.

Figure 4:
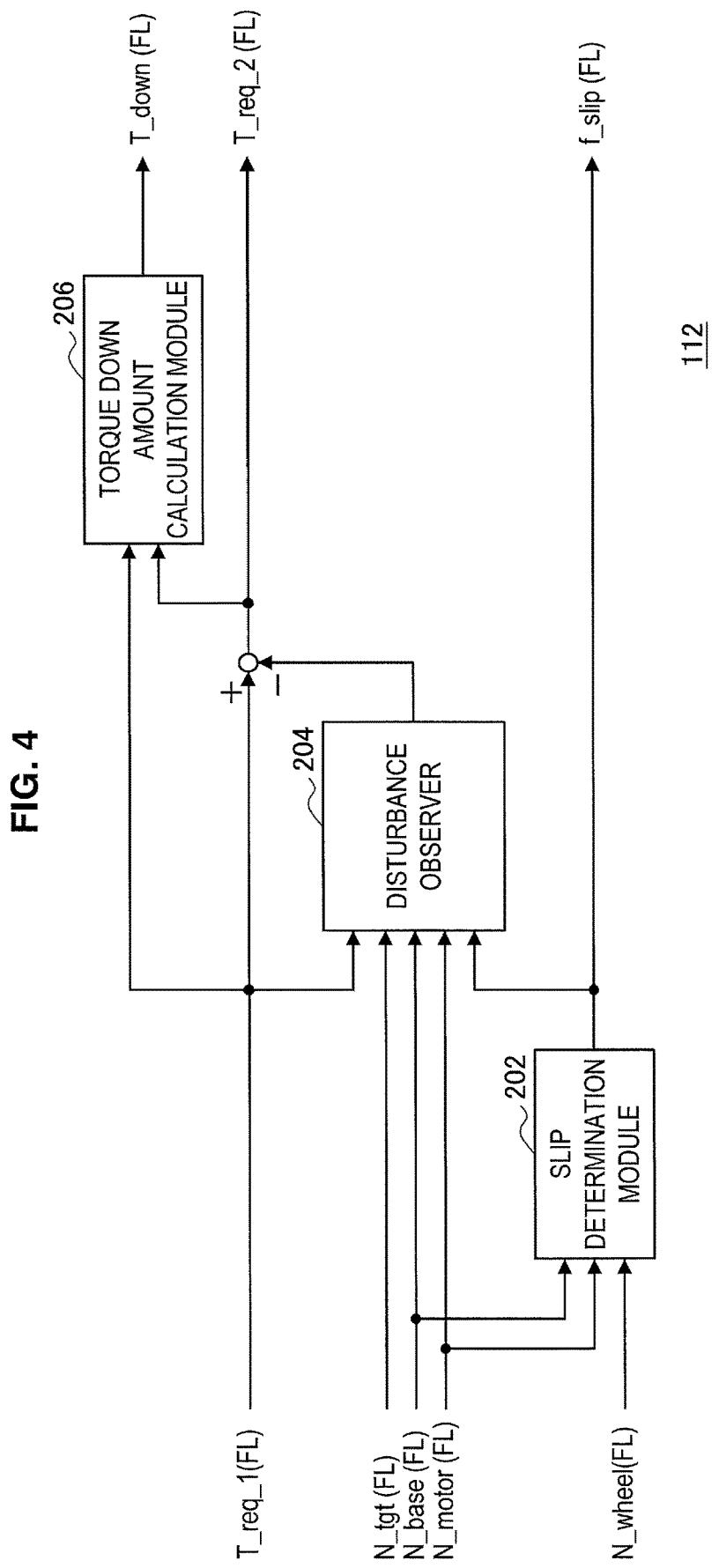
FIG. 4 is a schematic diagram specifically illustrating the configuration of a rotation speed control module.

FIG. 4 is a schematic diagram specifically illustrating the configuration of the rotation speed control module 112. As illustrated in FIG. 4, the rotation speed control module 112 includes a slip determination module 202, a disturbance observer 204, and a torque down amount calculation module 206. In FIG. 4, control of the front left wheel (FL) is taken as an example. The rotation speed control module 112 receives the requested torque T_req_1 (FL) of the front left wheel, the base rotation speed N_base (FL) of the front left wheel, the target rotation speed N_tgt (FL) of the front left wheel, the motor rotation speed N_motor (FL) of the front left wheel, and the tire rotation speed N_wheel (FL) of the front left wheel.

The slip determination module 202 of the rotation speed control module 112 performs slip determination on the basis of a deviation degree between the motor rotation speed N_motor (FL) and the base rotation speed N_base (FL). When the front left wheel is slipping, the slip determination module 202 turns on a slip determination flag f_slip (FL) (f_slip (FL)=1). As described above, the base rotation speed N_base (FL) corresponds to the rotation speed when a slip is not generated, and thus, in a case where the base rotation speed N_base (FL) deviates from the motor rotation speed N_motor (FL) by a predetermined value or more, it is determined that a slip is generated. Note that the tire rotation speed N_wheel (FL) of the front left wheel, which is inputted to the slip determination module 202, can be used mainly for slip end determination. In a case where the tire rotation speed N_wheel (FL) equals to or close to the base rotation speed N_base (FL), it can be determined that the slip is under control.

On the basis of the flip determination flag f_slip (FL), in a case where the front left wheel is not slipping, the rotation speed control module 112 outputs the requested torque T_req_1 (FL) of the front left wheel, which has been inputted from the redistribution control module 114, as the final requested torque T_req_2 (FL) of the motor of the front left wheel.

On the basis of the flip determination flag f_slip (FL), in a case where the front left wheel is slipping, the rotation speed control module 112 performs rotation speed control on the requested torque T_req_1 (FL) of the front left wheel, which has been inputted from the redistribution control module 114, and outputs the requested torque T_req_2 (FL) of the motor of the front left wheel. Thus, the rotation speed control module 112 determines the deviation between the target rotation speed N_tgt (FL) and the motor rotation speed N_motor (FL), and performs control so that the motor rotation speed N_motor (FL) can be equal to the target rotation speed N_tgt (FL).

Specifically, the torque down amount from the requested torque T_req_1 (FL) is computed by using the disturbance observer 204 so that the motor rotation speed N_motor (FL) can be equal to the target rotation speed N_tgt (FL). The thus obtained torque down amount T_down (FL) is subtracted from the requested torque T_req_1 (FL), and the requested torque T_req_2 (FL) is outputted. In this case, because the motor rotation speed N_motor (FL) varies easily, motor inertia is calculated from a wheel angular acceleration obtained from the tire rotation speed N_wheel (FL). On the basis of the base rotation speed N_base (FL), which is more stable with respect to variation, the torque down amount is calculated so as to cancel the variation in the angular acceleration. In this manner, the variation in the rotation speed can be suppressed.

The torque down amount calculation module 206 calculates the torque down amount T_down (FL) from the difference between the obtained final requested torque T_req_2 (FL) and the requested torque T_req_1 (FL).

FIG. 4 illustrates a case where the rotation speed control module 112 calculates the motor torque T_req_2 (FL), the torque down amount T_down (FL), and the slip determination flag f_slip (FL) after rotation speed control for the front left wheel (FL), and the rotation speed control module 112 calculates the motor torques T_req_2, the torque down amounts T_down, and the slip determination flags f_slip for all the wheels.

In the above manner, the rotation speed control module 112 independently controls the motors of the respective wheels, and limits the motor rotation speeds of the respective wheels. In this manner, compared with a case where control is performed by torque, the vibration of motors can be suppressed surely, and the responsibility and stability of control can be enhanced. In addition, redistribution control is performed independently of the rotation speed control, and the redistribution control module 114 is installed at a higher level than the rotation speed control module 112. Thus, while the rotation speed control is being performed, torque redistribution can be controlled, and while the vibration of the motors is suppressed, torque can be distributed surely. Furthermore, the redistribution results obtained by the redistribution control module 114 are set as the requested torques to the rotation speed control module 112. In this manner, a slip or vibration due to redistribution can be suppressed by the rotation speed control. Thus, torque can be redistributed without setting the upper limit on the torque, and reduction in driving force can be suppressed surely.

Meanwhile, redistribution control after the rotation speed control may lead to variation in torques due to redistribution, and the motors may vibrate. However, as in the present implementation, by performing the rotation speed control after redistribution, the motors do not vibrate and stable control becomes possible.

By use of these inputted values, the rotation speed control module 112 calculates and outputs the motor torques T_req_2 (FL, FR, RL, RR) after the rotation speed control, the torque down amounts T_down (FL, FR, RL, RR), and the slip determination flags f_slip (FL, FR, RL, RR) of the respective wheels. The motors of the respective wheels are controlled by the motor torques T_req_2 (FL, FR, RL, RR) after the rotation speed control.

Figure 5:
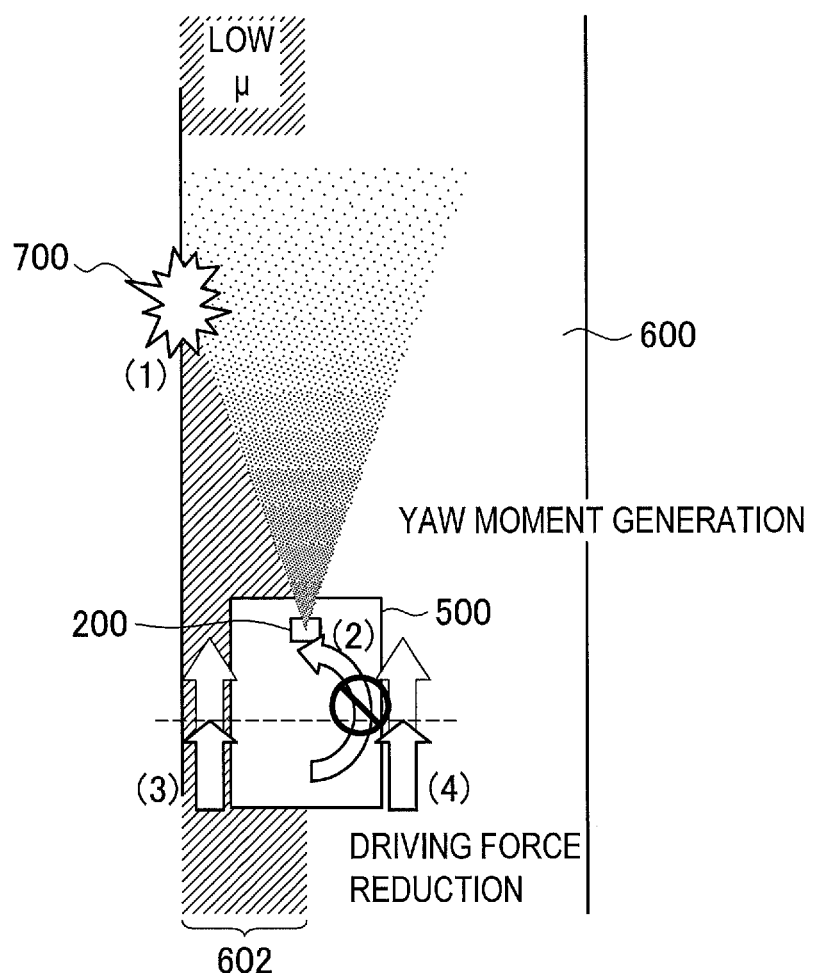
FIG. 5 is a schematic diagram illustrating control performed in the present implementation.
Figure 6:
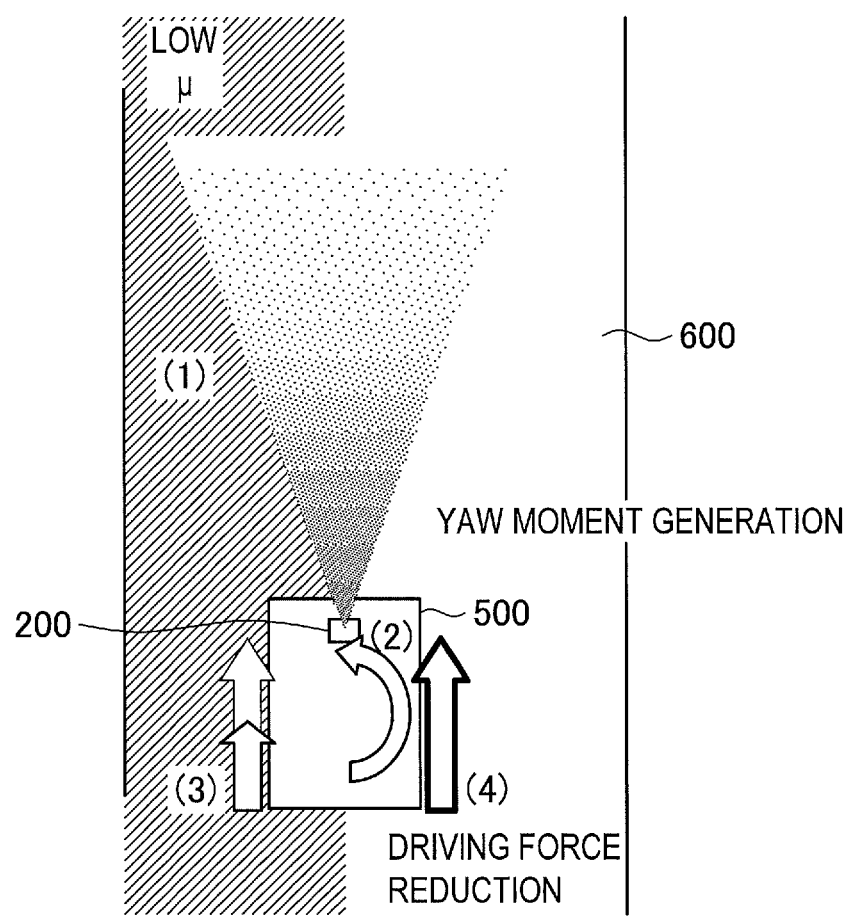
FIG. 6 is a schematic diagram illustrating control performed in the present implementation.

FIG. 5 and FIG. 6 are each a schematic diagram illustrating control performed in the present implementation, and a schematic diagram specifically illustrating control performed in the redistribution control module 114. Here, FIG. 5 illustrates a case where there is an obstacle 700 in the advancing direction of the vehicle 500, and FIG. 6 illustrates a case where there is no obstacle in the advancing direction of the vehicle 500. As illustrated in FIG. 5 and FIG. 6, the vehicle 500 is traveling on a road surface 600. The road surface 600 has a small road surface friction factor μ (low μ) in a left region 602. Further, the road surface 600 has a larger road surface friction factor μ (higher μ) in a right region than in the region 602. The vehicle 500 detects the obstacle 700 such as a wall or a gutter located on the side of the vehicle 500, and detects the distance to the obstacle 700, by use of the external environment recognition unit 200.

Figure 11:
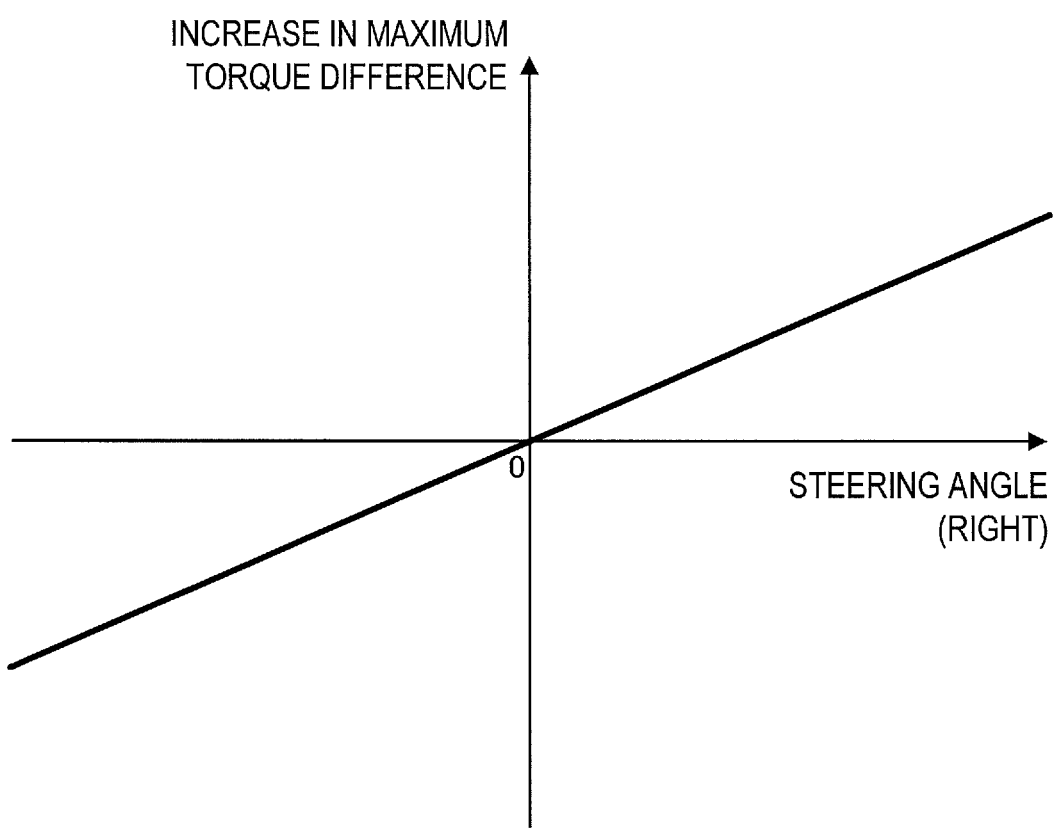
FIG. 11 is a schematic diagram illustrating a map for obtaining an increase in maximum torque difference depending on a steering wheel steering angle when the maximum torque difference is calculated by considering the steering wheel steering angle.

As illustrated in FIG. 5, in a step (1), when the obstacle 700 such as a wall or a gutter is found on the road surface 600, in a step (2), a maximum driving force difference (a maximum torque difference ΔT_max) is calculated depending on a difference D between the obstacle 700 and the vehicle 500. The maximum driving force difference is calculated by the maximum driving force difference calculation module 113. Then, in steps (3) and (4), a difference ΔT in actual motor torque T_motor between the left and the right is set as an actual driving force difference, and depending on the maximum torque difference ΔT_max, the difference ΔT in actual motor torque T_motor between the left and the right is limited. Note that the maximum driving force difference calculation module 113 can also calculate the maximum driving force difference on the basis of the distance D and the steering wheel steering angle. In a case where the maximum driving force difference is calculated by considering the steering wheel steering angle, from a map illustrated in FIG. 11, the increase in maximum torque difference (vertical axis) depending on the steering wheel steering angle (horizontal axis) is obtained, and the obtained increase in maximum torque difference is added to the maximum torque difference ΔT_max. Through experiment or the like, optimal values for the map illustrated in FIG. 11 can be obtained. According to the map illustrated in FIG. 11, as the steering wheel is turned to the right, the maximum torque difference ΔT_max is increased; as the steering wheel is turned to the left, the maximum torque difference ΔT_max is decreased. Therefore, when a driver turns the steering wheel to the right predicting the generation of counter-clockwise moment, the maximum torque difference ΔT_max is increased, resulting in securing the driving force. Further, when the direction of the obstacle 700 corresponds to the direction of steering (for example, when counter-clockwise steering is made while the counter-clockwise moment (turning) is limited), the increase in maximum torque difference is set to 0. Accordingly, when the driver turns the steering wheel predicting the generation of moment, the maximum driving force difference can be changed optimally depending on the steering angle.

Figure 7:
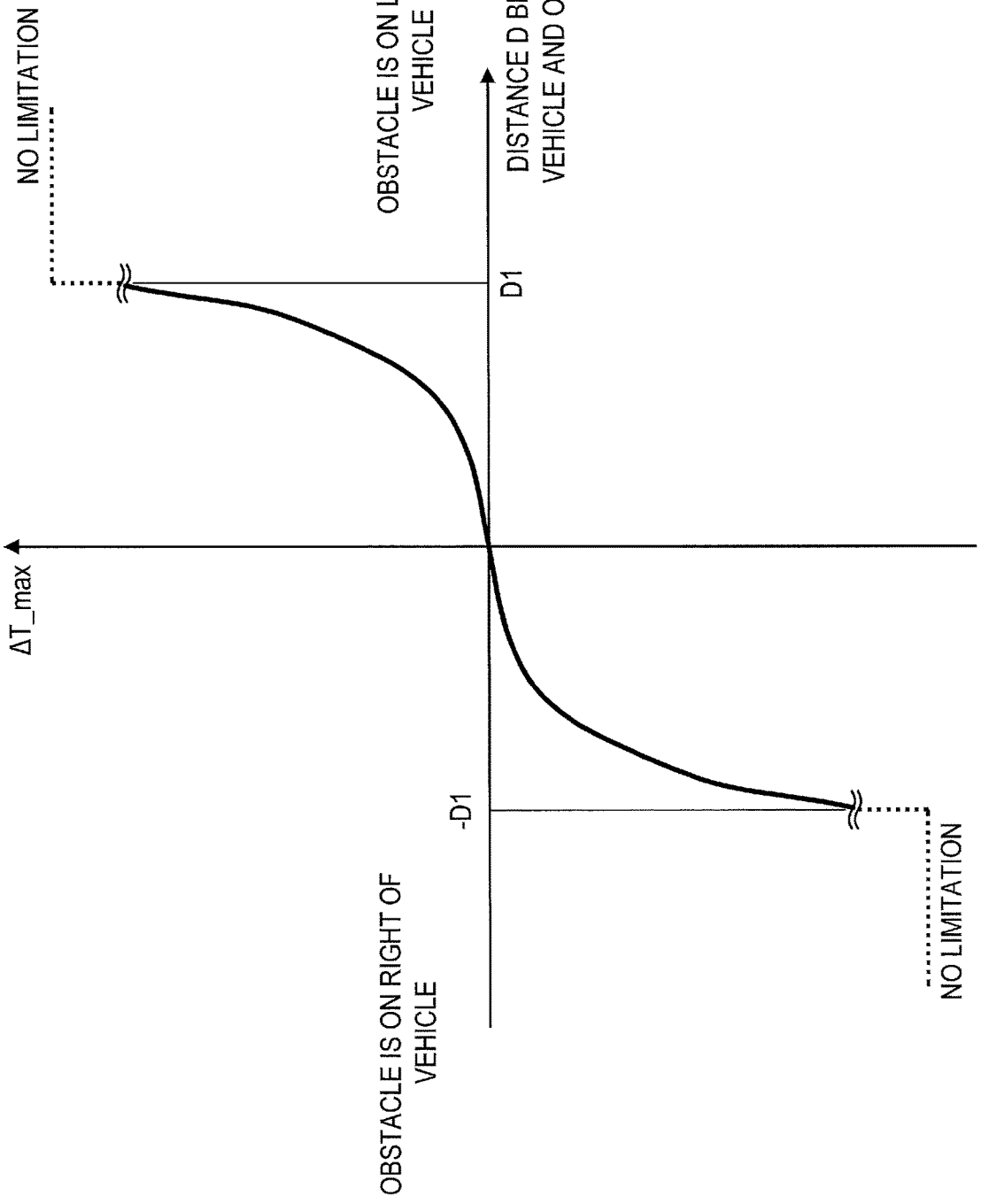
FIG. 7 is a schematic diagram illustrating a map for calculating a maximum torque difference $\Delta T\_max$ depending on a distance D between an obstacle and a vehicle.

FIG. 7 is a schematic diagram illustrating a map for calculating, by the maximum driving force difference calculation module 113, the maximum torque difference ΔT_max depending on the distance D between the obstacle 700 and the vehicle 500. In FIG. 7, the distance D becomes a positive value and the maximum torque difference ΔT_max becomes a positive value when the obstacle 700 exists on the left with respect to the center in the width direction of the vehicle 500. In addition, the distance D becomes a negative value and the maximum torque difference ΔT_max becomes a negative value when the obstacle 700 exists on the right with respect to the center in the width direction of the vehicle 500. By switching between the positive and negative values of the maximum torque difference ΔT_max depending on the left and right positions of the obstacle in this manner, it becomes possible to suppress counter-clockwise turning and clockwise turning of the vehicle 500 depending on the left and right positions of the obstacle 700.

As illustrated in FIG. 7, as the absolute value of the distance D becomes larger, the absolute value of the maximum torque difference ΔT_max is set to a larger value; when the absolute value of the distance D becomes an absolute value of a distance D1 or more, there is no limitation on the actual driving force difference ΔT. In other words, as the distance between the obstacle 700 and the vehicle 500 becomes larger, the limitation by the maximum torque difference ΔT_max becomes looser. Then, when the distance between the obstacle 700 and the vehicle 500 becomes a certain value (D1) or more, the limitation by the maximum torque difference ΔT_max is removed.

Figure 8:
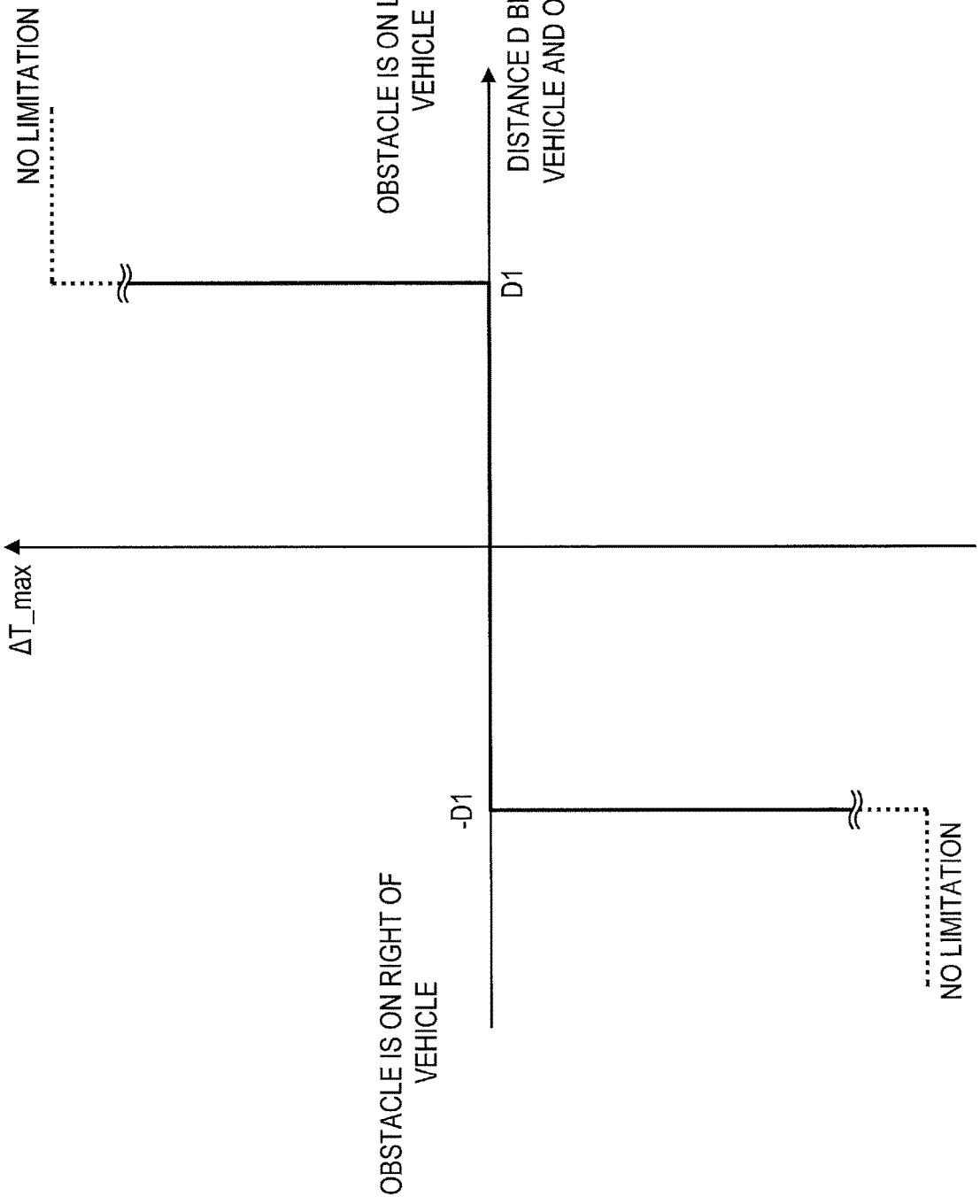
FIG. 8 is a schematic diagram illustrating a map for calculating a maximum torque difference $\Delta T\_max$ depending on a distance D between an obstacle and a vehicle.

As illustrated in FIG. 8, until the absolute value of the distance D between the obstacle 700 and the vehicle 500 becomes smaller than or equal to D1, the maximum torque difference ΔT_max may be limited to 0 or less. In this case, when the absolute value of the distance D is D1 or less, the maximum torque difference ΔT_max becomes 0 or less, and therefore, opposite moment of the turning direction is generated.

In a case where the actual driving force difference ΔT in actual motor torque T_motor between the left and the right is ΔT_max or more, the torque T_req_1 of a wheel having a larger actual motor torque T_motor of the left and the right is limited by the sum of a smaller torque T_motor of the other wheel and the maximum torque difference ΔT_max (T_motor+ΔT_max). Thus, there is a limitation on the yaw rate generated by the actual driving force difference ΔT.

In the example of FIG. 5, the left wheel (the left wheel here may be either the front or rear left wheel, and the right wheel here may be the front or rear right wheel) is in contact with the low-μ region 602, and thus the slip determination module 202 determines that the left wheel is slipping. Thus, in the step (3), torque down is performed on the left wheel by slip control, and the actual driving force difference ΔT between the left and the right is limited by the maximum torque difference ΔT_max; therefore, in the step (4), torque down is also performed on the high-μ right wheel. In this case, as for the slipping left wheel, torque down is performed by slip control in which the motor rotation speeds are controlled with respect to the target rotation speeds. Thus, the high-level requested torques T_req_0 are inputted to the rotation speed control module 112 and set as the requested torques T_req_1 of the rotation speed control module 112. As for the non-slipping right wheel, the actual motor torque T_motor of the right wheel is limited to the sum of the actual motor torque T_motor of the left wheel and the maximum torque difference ΔT_max, and the generation of a yaw rate is limited so as to perform torque down. Thus, counter-clockwise turning of the vehicle 500 can be suppressed surely, and it becomes possible to surely prevent the vehicle 500 from colliding with the obstacle.

As described above, as the distance D to the obstacle 700 is larger, the maximum torque difference ΔT_max becomes larger. Thus, the left and right actual motor torques T_motor are unlikely to be limited, and control can be performed by setting a high value on the driving force. As the distance D to the obstacle 700 is smaller, the maximum torque difference ΔT_max becomes smaller. Thus, the left-and-right actual motor torques T_motor are likely to be limited, and control can be performed by setting a high value on the stability, suppressing turning. Therefore, such control enables switching between control setting a high value on the driving force and control setting a high value on the stability, and thus, the stability can be increased while reduction in driving force can be suppressed as much as possible.

In the above manner, only when the actual driving force difference ΔT between the left and right actual motor torques T_motor exceeds the maximum torque difference ΔT_max, torque down control of the non-slipping wheel is performed in a manner that the actual driving force difference ΔT and the maximum torque difference ΔT_max become equal to each other. In the example illustrated in FIG. 5, torque down control is performed on the non-slipping right wheel. Thus, the vehicle 500 can be surely prevented from colliding with the obstacle 700, and control setting a high value on the stability can be performed.

As in the example illustrated in FIG. 5, for example, when the vehicle travels on a narrow road where snow remains on the shoulder, the road surface friction factor μ of the left region 602 on the road surface 600 becomes smaller. In such a case, if torque down is constantly performed on the non-slipping right wheel, on a relatively wide road, for example, the left wheel does not always travel on snow, resulting in a lack of driving force.

Therefore, as illustrated in FIG. 6, in the step (1), in a case where the obstacle 700 is not found on the road surface 600, as in a case where the distance D is the certain value D1 or more in FIG. 7 and FIG. 8, limitation by the maximum driving force difference (the maximum torque difference ΔT_max) is not performed. Thus, in the step (2), the yaw rate is not limited by the maximum torque difference ΔT_max. In this case, in the step (3), as for the slipping left wheel, torque down is performed, and in the step (4), as for the non-slipping right wheel, torque down is not performed. Because torque down is not performed on the right wheel, a yaw rate is generated, and as compared with FIG. 5, an unintended reduction in driving force can be suppressed. Therefore, a lack of driving force can be prevented surely, and control setting a high value on the driving force can be performed.

It is noted that control of the front wheels or the rear wheels is taken as an example in FIG. 5 and FIG. 6. In the example in FIG. 5, for example, in a case where the front left wheel is slipping, torque down is performed on the front right wheel by the maximum torque difference ΔT_max. In addition, for example, in a case where the rear left wheel is slipping, torque down is performed on the rear right wheel by the maximum torque difference ΔT_max.

Figure 9:
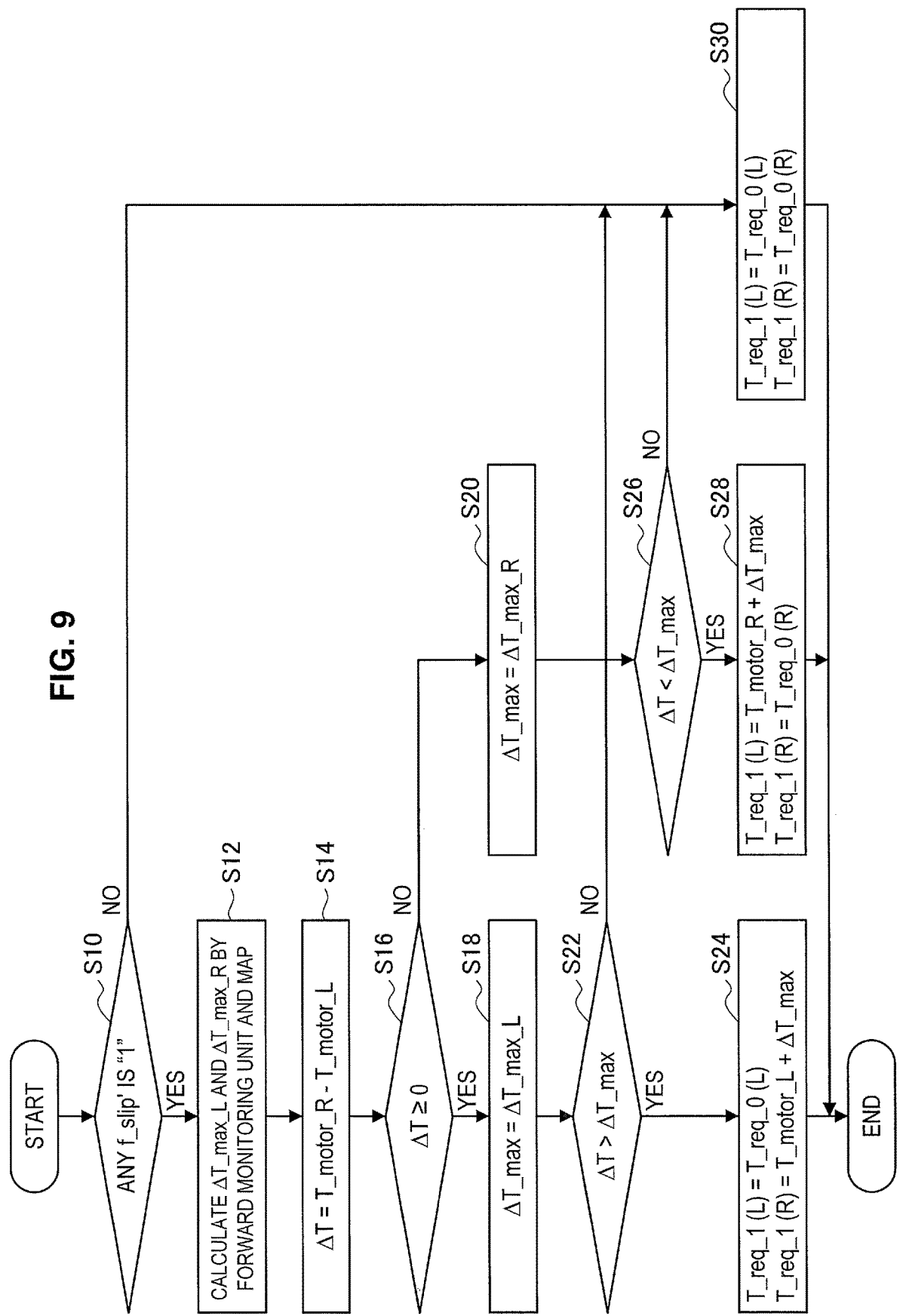
FIG. 9 is a flowchart illustrating a processing procedure in a vehicle control device according to the present implementation.

Next, a processing procedure in the vehicle control device 100 according to the present implementation will be described with reference to a flowchart in FIG. 9. First, in a step S10, in order to determine whether or not a slip is generated on each wheel, it is determined whether or not the previous flip determination flag f_slip' is "1". When f_slip' of any of the wheels is "1", the processing proceeds to the next step, a step S12. In the step S12, on the basis of the map in FIG. 7, the maximum torque difference ΔT_max is calculated from the distance to the obstacle, calculated by a forward monitoring unit (stereo camera assembly). Here, as the maximum torque difference ΔT_max, a maximum torque difference ΔT_max_L for counter-clockwise limitation and a maximum torque difference ΔT_max_R for clockwise limitation are calculated.

In a case where the obstacle 700 is on the left side as illustrated in FIG. 5, ΔT_max_L (>0) for counter-clockwise limitation is calculated. In a case where the obstacle 700 is on the right side, ΔT_max_R (<0) for clockwise limitation is calculated.

In the next step, a step S14, the actual driving force difference ΔT is calculated from the difference between the actual motor torque T_motor_R of the right wheel and the actual motor torque T_motor_L of the left wheel. In the next step, a step S16, in order to discriminate the generation direction of moment, it is determined whether or not ΔT≥0.

When ΔT≥0, the processing proceeds to a step S18. In this case, the actual motor torque T_motor_R of the right wheel is greater than or equal to the actual motor torque T_motor_L of the left wheel, and thus, counter-clockwise turning might occur. Therefore, in the step S18, the maximum torque difference ΔT_max is set to the maximum torque difference ΔT_max_L for counter-clockwise limitation (ΔT_max=ΔT_max_L).

On the other hand, when ΔT<0 in the step S16, the processing proceeds to a step S20. In this case, the actual motor torque T_motor_L of the left wheel is greater than the actual motor torque T_motor_R of the right wheel, and thus, clockwise turning might occur. Therefore, in the step S20, the maximum torque difference ΔT_max is set to the maximum torque difference ΔT_max_R for clockwise limitation (ΔT_max=ΔT_max_R).

After the step S18, the processing proceeds to a step S22, and it is determined whether or not ΔT>ΔT_max. When ΔT>ΔT_max, the processing proceeds to a step S24. When the processing proceeds to the step S24, the actual motor torque T_motor_R of the right wheel is larger than the actual motor torque T_motor_L of the left wheel, and the difference therebetween exceeds ΔT_max. Thus, torque down is performed on the actual motor torque T_motor_R of the right wheel. Therefore, the left-side redistributed motor torque T_req_1 (L) is set to the high-level requested torque T_req_0 (L) (T_req_1 (L)=T_req_0 (L)). In addition, the right-side redistributed motor torque T_req_1 (R) is set to the sum of the left-side actual motor torque T_motor_L and the maximum torque difference ΔT_max (T_req_1 (R)=T_motor_L+ΔT_max). In this manner, torque down is performed on the right wheel. Note that, at the time slip control is performed on the left wheel, the high-level requested torque T_req_0 (L) deviates from the actual motor torque T_motor_L. Therefore, the right-side redistributed motor torque T_req_1 (R) is set to the sum of the left-side actual motor torque T_motor_L and the maximum torque difference ΔT_max. Thus, the difference in the actual motor torque between the left and right wheels can be controlled more precisely than in a case where the right-side redistributed motor torque T_req_1 (R) is the sum of the high-level requested torque T_req_0 (L) and the maximum torque difference ΔT_max.

After the step S20, the processing proceeds to a step S26, and it is determined whether or not ΔT<ΔT_max. When ΔT<ΔT_max, the processing proceeds to a step S28. When the processing proceeds to the step S28, the actual motor torque T_motor_L of the left wheel is larger than the actual motor torque T_motor_R of the right wheel, and ΔT is smaller than ΔT_max. In other words, because ΔT and ΔT_max are each a negative value, the difference (the absolute value of ΔT) obtained by subtracting the actual motor torque T_motor_R of the right wheel from the actual motor torque T_motor_L of the left wheel is larger than the absolute value of ΔT_max. Accordingly, torque down is performed on the actual motor torque T_motor_L of the left wheel. Therefore, the left-side redistributed motor torque T_req_1 (L) is the sum of the actual motor torque T_motor_R of the right wheel and the maximum torque difference ΔT_max (T_req_1 (L)=T_motor_R+ΔT_max). In addition, the right-side redistributed motor torque T_req_1 (R) is set to the high-level requested torque T_req_0 (R) (T_req_1 (R)=T_req_0 (R)). In this manner, torque down is performed on the left wheel.

In a case where torque down is performed in the step S24 and the step S28, the warning generation unit 115 generates a warning sound or displays a warning on an on-vehicle display, for example, so as to warn the driver of reduction in driving force.

When the previous flip determination flag f_slip' of each wheel is "0" in the step S10, when ΔT≤ΔT_max in the step S22, or when ΔT≥ΔT_max in the step S26, the processing proceeds to a step S30. In the step S30, the left-side redistributed motor torque T_req_1 (L) is set to the high-level requested torque T_req_0 (L) (T_req_1 (L)=T_req_0 (L)), and the right-side redistributed motor torque T_req_1 (R) is set to the high-level requested torque T_req_0 (R) (T_req_1 (R)=T_req_0 (R)). That is, when the processing proceeds to the step S30, torque down is not performed on the right wheel or the left wheel.

When the redistributed motor torques T_req_1 are obtained in the step S24, the step S28, and the step S30, the redistributed motor torques T_req_1 are inputted to the rotation speed control module 112, and motor torques T_req_2 after rotation speed control are calculated through the above processing.

Figure 10:
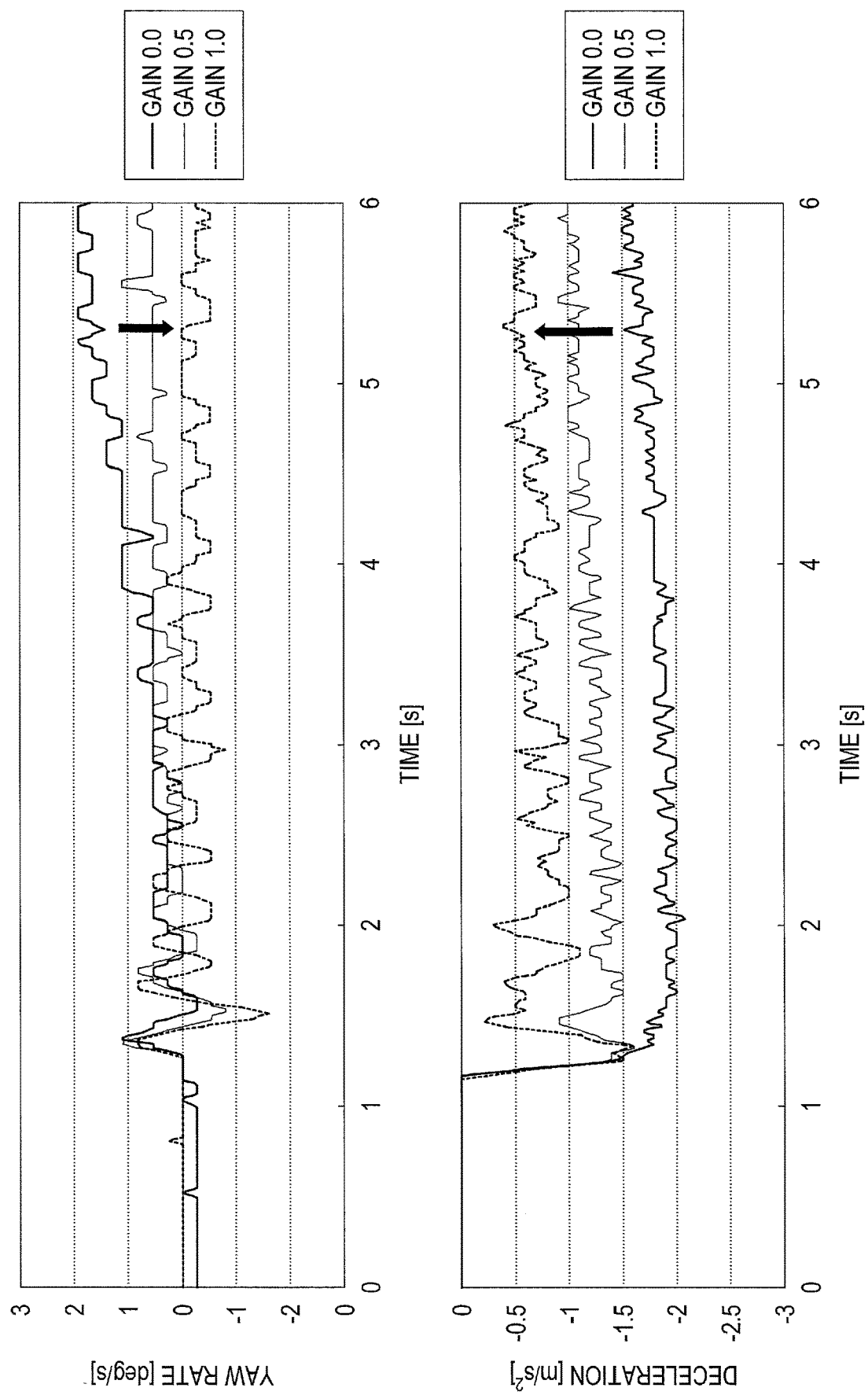
FIG. 10 is a characteristic diagram illustrating changes in yaw rate and vehicle deceleration when control of the present implementation is performed.

FIG. 10 is a characteristic diagram illustrating changes in yaw rate and vehicle deceleration when control of the present implementation is performed. In FIG. 10, the upper diagram illustrates the change in yaw rate and the lower diagram illustrates the change in deceleration. Characteristics illustrated in FIG. 10 are obtained by simulation in which road surface friction factors are different between the left and right wheels, the left wheels travel on a low-μ road surface such as porcelain tile, and the right wheels travel on a high-μ road surface such as asphalt, at full throttle acceleration. Here, characteristics are obtained by switching the gain in three stages. Gain 0.0 denotes a case where there is no limitation on the left and right driving force difference, gain 1.0 denotes a case where the left and right driving forces are limited so as to be equal torques, and gain 0.5 denotes a case where the left and right driving force difference is the intermediate value between gain 0.0 and gain 1.0.

As is found from FIG. 10, when the limitation on the driving force difference is made stronger in the order of gain 0.0, gain 0.5, and gain 1.0, the yaw rate converges to 0, and the turning of the vehicle 500 can be suppressed. Therefore, by limiting the driving force difference depending on the distance to the obstacle 700 by the control according to the present implementation, the turning of the vehicle 500 can be suppressed surely.

As is also found from FIG. 10, when the limitation on the driving force difference is made stronger in the order of gain 0.0, gain 0.5, and gain 1.0, the deceleration approaches 0, and the driving force is reduced. Therefore, by limiting the driving force difference depending on the distance to the obstacle 700 by the control according to the present implementation, the driving force of the vehicle 500 can be controlled optimally.

As described above, according to the present implementation, it becomes possible to suppress the turning of the vehicle caused by the difference in friction factor between the left and right wheels, and also to secure the driving force.

Although the preferred implementation of the present disclosure has been described in detail with reference to the appended drawings, the present disclosure is not limited thereto. It is obvious to those skilled in the art that various modifications or variations are possible insofar as they are within the technical scope of the appended claims or the equivalents thereof. It should be understood that such modifications or variations are also within the technical scope of the present disclosure.

The invention claimed is:

1. A vehicle control device, comprising:
one or more obstacle sensors for detecting an obstacle in front of a vehicle and detecting a distance of the vehicle to the obstacle; and
one or more controllers that execute:
calculating, in accordance with a steering angle of the vehicle and the distance of the vehicle to the obstacle that is detected using the one or more obstacle sensors, a maximum driving force difference between a left wheel and a right wheel of the vehicle, the left wheel and the right wheel being either one of a pair of left and right front wheels of the vehicle and a pair of left and right rear wheels of the vehicle;
determining that at least one of the left wheel and the right wheel is slipping;
causing, when determining that the at least one of the left wheel and the right wheel is slipping, the left wheel and the right wheel to drive with adjusted torques that are set based on an actual yaw rate and a target yaw rate, wherein
the actual yaw rate is detected using one or more yaw rate sensors of the vehicle,
the target yaw rate is set based on the steering angle of the vehicle, and
the adjusted torques include a first torque of a first motor that drives the left wheel and a second torque of a second motor that drives the right wheel;
determining that an actual driving force difference exceeds the maximum driving force difference, the actual driving force difference indicating a difference between the first torque and the second torque; and
redistributing, responsive to determining at least that the actual driving force difference exceeds the maximum driving force difference, the first torque and the second torque to cause the actual driving force difference to become lower than or equal to the maximum driving force difference,
wherein, when the actual driving force difference is less than the maximum driving force difference, the one or more controllers cause the left wheel and the right wheel to drive with the adjusted torques, without executing the redistributing of the first torque and the second torque.

2. The vehicle control device according to claim 1, wherein the one or more controllers execute, when determining either one of the left wheel and the right wheel is slipping and another one of the left wheel and the right wheel is not slipping, the redistributing of the first torque and the second torque by limiting a torque of a motor having a larger torque among the first motor and the second motor to a determined value, and
wherein the determined value is calculated by adding the maximum driving force difference to a torque of a motor having a smaller torque among the first motor and the second motor.

3. The vehicle control device according to claim 2, wherein the one or more controllers set, in the redistributing of the first torque and the second torque, the torque of the motor having the smaller torque among the first motor and the second motor as a driver's requested driving force obtained from an accelerator position and a braking operation amount.

4. The vehicle control device according to claim 1, wherein, in the determining that at least one of the left wheel and the right wheel is slipping, the one or more controllers:
set a lowest rotation speed among rotation speeds of wheels of the vehicle as a base rotation speed; and
determine that one of the left wheel and the right wheel is slipping based on the base rotation speed and a rotation speed of one of the first motor and the second motor corresponding to the one of the left wheel and the right wheel.

5. The vehicle control device according to claim 4, wherein the one or more controllers:
calculate target rotation speeds of the wheels of the vehicle based on the base rotation speed; and
calculate, based on a result of the determining that the one of the left wheel and the right wheel is slipping, a request torque of a motor of the one of the left wheel and the right wheel in a manner that a rotation speed of the one of the left wheel and the right wheel becomes equal to a target rotation speed of the one of the left wheel and the right wheel.

6. The vehicle control device according to claim 1, wherein the one or more controllers generate a warning to a driver of the vehicle in response to the redistributing of the first torque and the second torque.

7. The vehicle control device according to claim 1,
wherein an absolute value of the maximum driving force difference is set to be increased, responsive to increasing an absolute value of the distance of the vehicle to the obstacle.

8. The vehicle control device according to claim 1,
wherein the redistributing of the first torque and the second torque includes:
setting, when determining at least that (1) the actual driving force difference exceeds the maximum driving force difference, and (2) an absolute value of the distance of the vehicle to the obstacle is less than a predetermined value, a limitation on the actual driving force difference by the redistributing of the first torque and the second torque to cause the actual driving force difference to become lower than or equal to the maximum driving force difference, an absolute value of the maximum driving force difference being set to be increased responsive to increasing an absolute value of the distance of the vehicle to the obstacle, and
removing the limitation, when determining at least that the absolute value of the distance of the vehicle to the obstacle is the predetermined value or more.

9. The vehicle control device according to claim 1,
wherein the redistributing of the first torque and the second torque includes:
setting, when determining at least that (1) the actual driving force difference exceeds the maximum driving force difference, and (2) an absolute value of the distance of the vehicle to the obstacle is less than a predetermined value, a limitation on the actual driving force difference by the redistributing of the first torque and the second torque to cause the actual driving force difference to become lower than or equal to the maximum driving force difference, an absolute value of the maximum driving force difference being set to be zero or less when an absolute value of the distance of the vehicle to the obstacle is a predetermined value or less, and
removing the limitation, when determining at least that the absolute value of the distance of the vehicle to the obstacle is the predetermined value or more.

10. The vehicle control device according to claim 1, further comprising one or more cameras including the one or more obstacle sensors.

11. A vehicle control method, comprising:
receiving information of an obstacle in front of a vehicle and a distance of the vehicle to the obstacle, the obstacle and the distance of the vehicle to the obstacle being detected using one or more sensors of the vehicle;
calculating, in accordance with a steering angle of the vehicle and the distance of the vehicle to the obstacle, a maximum driving force difference between a left wheel and a right wheel of the vehicle, the left wheel and the right wheel being either one of a pair of left and right front wheels of the vehicle and a pair of left and right rear wheels of the vehicle;
determining that at least one of the left wheel and the right wheel is slipping;
causing, when determining that the at least one of the left wheel and the right wheel is slipping, the left wheel and the right wheel to drive with adjusted torques that are set based on an actual yaw rate and a target yaw rate, wherein
the actual yaw rate is detected by one or more yaw rate sensors of the vehicle,
the target yaw rate is set based on the steering angle of the vehicle, and
the adjusted torques include a first torque of a first motor that drives the left wheel and a second torque of a second motor that drives the right wheel;
determining that an actual driving force difference exceeds the maximum driving force difference, the actual driving force difference indicating a difference between the first torque and the second torque; and
redistributing, responsive to determining at least that the actual driving force difference exceeds the maximum driving force difference, the first torque and the second torque to cause the actual driving force difference to become lower than or equal to the maximum driving force difference,
wherein, when the actual driving force difference is less than the maximum driving force difference, one or more controllers of the vehicle cause the left wheel and the right wheel to drive with the adjusted torques, without executing the redistributing of the first torque and the second torque.

12. The vehicle control method according to claim 11,
wherein, when determining either one of the left wheel and the right wheel is slipping and another one of the left wheel and the right wheel is not slipping, the redistributing of the first torque and the second torque includes limiting a torque of a motor having a larger torque among the first motor and the second motor to a determined value, and
wherein the determined value is calculated by adding the maximum driving force difference to a torque of a motor having a smaller torque among the first motor and the second motor.

13. The vehicle control method according to claim 12, wherein, in the redistributing of the first torque and the second torque, the torque of the motor having the smaller torque among the first motor and the second motor is set as a driver's requested driving force obtained from an accelerator position and a braking operation amount.

14. The vehicle control method according to claim 11, wherein, in the calculating of the maximum driving force difference, the maximum driving force difference is calculated in accordance with the distance of the vehicle to the obstacle and a steering wheel steering angle of the vehicle.

15. The vehicle control method according to claim 11, further comprising:

generating a warning to a driver of the vehicle in response to the redistributing of the first torque and the second torque.

16. The vehicle control method according to claim 11, wherein, in the calculating of the maximum driving difference, an absolute value of the maximum driving force difference is set to be increased, responsive to increasing an absolute value of the distance of the vehicle to the obstacle.

17. The vehicle control method according to claim 11, wherein, the redistributing of the first torque and the second torque includes:
setting, when determining at least that (1) the actual driving force difference exceeds the maximum driving force difference, and (2) an absolute value of the distance of the vehicle to the obstacle is less than a predetermined value, a limitation on the actual driving force difference by the redistributing of the first torque and the second torque to cause the actual driving force difference to become lower than or equal to the maximum driving force difference, an absolute value of the maximum driving force difference being set to be increased responsive to increasing an absolute value of the distance of the vehicle to the obstacle, and
removing the limitation, when determining at least that the absolute value of the distance of the vehicle to the obstacle is the predetermined value or more.

18. The vehicle control method according to claim 11, wherein the redistributing of the first torque and the second torque includes:
setting, when determining at least that (1) the actual driving force difference exceeds the maximum driving force difference, and (2) an absolute value of the distance of the vehicle to the obstacle is less than a predetermined value, a limitation on the actual driving force difference by the redistributing of the first torque and the second torque to cause the actual driving force difference to become lower than or equal to the maximum driving force difference, an absolute vale of the maximum driving force difference being set to be zero or less when an absolute value of the distance of the vehicle to the obstacle is a predetermined value or less, and
removing the limitation, when determining at least that the absolute value of the distance of the vehicle to the obstacle is the predetermined value or more.

19. The vehicle control method according to claim 11, further comprising capturing an image of an external environment including the obstacle using one or more cameras, wherein the one or more cameras includes the one or more sensors, and are equipped in the vehicle.

20. A vehicle control device, comprising:
one or more obstacle sensors for detecting an obstacle in front of a vehicle and detecting a distance of the vehicle to the obstacle; and
one or more controllers that execute:
calculating, based on the distance of the vehicle to the obstacle that is detected using the one or more obstacle sensors, a maximum driving force difference between a left wheel and a right wheel of the vehicle, the left wheel and the right wheel being either one of a pair of left and right front wheels of the vehicle and a pair of left and right rear wheels of the vehicle, wherein
an absolute value of the maximum driving force difference is set to be increased, responsive to increasing an absolute value of the distance of the vehicle to the obstacle;
determining that at least one of the left wheel and the right wheel is slipping;
causing, when determining that the at least one of the left wheel and the right wheel is slipping, the left wheel and the right wheel to drive with adjusted torques that are set based on an actual yaw rate and a target yaw rate, wherein
the actual yaw rate is detected using one or more yaw rate sensors of the vehicle,
the target yaw rate is set based on a steering angle of the vehicle, and
the adjusted torques include a first torque of a first motor that drives the left wheel and a second torque of a second motor that drives the right wheel;
determining that an actual driving force difference exceeds the maximum driving force difference, the actual driving force difference indicating a difference between the first torque and the second torque; and
redistributing, responsive to determining at least that the actual driving force difference exceeds the maximum driving force difference, the first torque and the second torque to cause the actual driving force difference to become lower than or equal to the maximum driving force difference,
wherein, when the actual driving force difference is less than the maximum driving force difference, the one or more controllers cause the left wheel and the right wheel to drive with the adjusted torques, without executing the redistributing of the first torque and the second torque.

* * * * *